Figure 1:
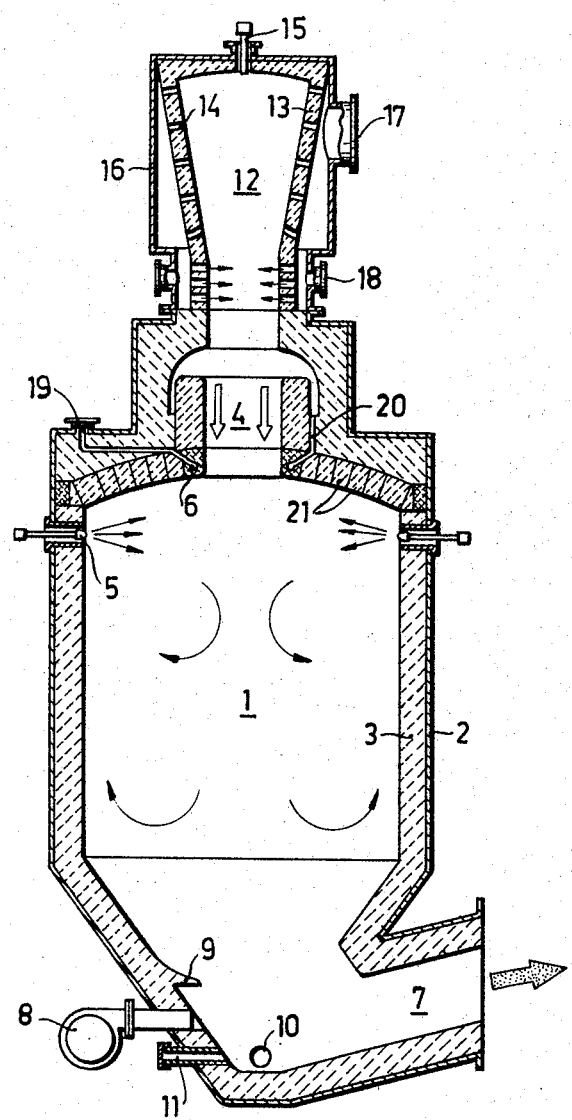

Aug. 1, 1967   C. A. BERGHOLM   3,333,917
PYROLYSIS OF A SPENT SODIUM-BASED CELLULOSE LIQUOR
Filed Feb. 15, 1965   2 Sheets-Sheet 2

INVENTOR
Carl Arne Bergholm
BY Pierce, Scheffler & Parker
ATTORNEYS

3,333,917
PYROLYSIS OF A SPENT SODIUM-BASED
CELLULOSE LIQUOR
Carl Arne Bergholm, Sundsvall, Sweden, assignor to Billeruds Aktiebolag, Säffle, Sweden, and Svenska Cellulosa Aktiebolaget, Sundsvall, Sweden, both companies of Sweden
Filed Feb. 15, 1965, Ser. No. 432,746
Claims priority, application Sweden, Feb. 26, 1964, 2,379/64
4 Claims. (Cl. 23—48)

This invention relates to the pyrolysis of a spent sodium-based cellulose liquor in order to recover heat and chemicals. The invention is useful for the pyrolysis of spent liquors from the sulphate process, but it is particularly useful for the pyrolysis of spent liquors from the sulphite process, in which it is desired to recover the sodium as pure soda.

It is known to transform the organic substance of spent sodium-based liquors from the cellulose production into a combustible gas and carbon by pyrolyzing the evaporated liquors. The sodium compounds are mainly converted into sodium carbonate. The heat required for the pyrolysis is produced by the addition of a hot gas which contains free oxygen, said free oxygen producing part of the heat by combusting part of the organic substance of the spent liquor. After the pyrolysis, which involves a thermal decomposition and a partial combustion, the powder is separated from the gas, and the sodium carbonate is used as raw-material for fresh digestion liquor, while gas and, if desired, carbon is combusted in a boiler. Consequently, chemicals and heat are recovered.

In a pyrolyzing furnace or reactor for carrying out the method outlined above, a coating of molten or sintered sodium carbonate is liable to be formed in the zone around the hot gas inlets, at least when the temperature is near the melting point of soda. Said molten soda flows down the reactor wall, absorbing more powder. Also the ceiling of the reactor is liable to being overheated, resulting in a precipitation of molten soda powder. It is another inconvenience of said type of reactors that a large number of ceramic nozzles must be used for effecting a rapid intermixing of the hot gas and the spent liquor. Said nozzles are liable to being obstructed by reaction products of the soda and the ceramic lining of the furnace, or by impurities in the spent liquor.

The invention aims at reducing or eliminating said inconveniences. Experiments have proved that soda-containing powder which impinges onto a wall having a temperature above approximately 850° will, to the main part, deposit on the wall in a substantially viscid, molten form. This does not occur if the wall has a temperature below approximately 825°.

Thus, the method of the invention relates to the pyrolysis of a spent sodium-based cellulose liquor for the recovery of sodium as soda, and comprises creating a stream of an oxygen-containing gas having a temperature above 600° C., creating a plurality of streams of atomized spent liquor, directing said streams of atomized spent liquor towards said stream of hot gas, to produce a pyrolysis and a partial combustion of the organic matter of the spent liquor, and separating the soda-containing powder thus formed from the combustible gas thus formed.

The invention also relates to an apparatus for the pyrolysis of a sodium-based spent cellulose liquor. This apparatus comprises a reactor, at least one opening for introducing into the reactor a stream of a gas which has been heated to at least 600° C. and which contains free oxygen, and a plurality of nozzles for atomizing the spent liquor and for introducing the spent liquor into the reactor, said apparatus being characterized in that the opening for the hot gas stream is situated centrally in one end wall of the reactor, to the effect that the hot gas stream extends at a distance from the side walls of the reactor, the nozzles being situated at the side walls of the reactor and being directed towards the hot gas stream, preferably substantially at right angle to said hot gas stream.

The streams of spent liquor shall preferably be directed substantially at right angle to the hot gas stream, and can be allowed to deviate not more than 30° from said direction.

Figure 2:
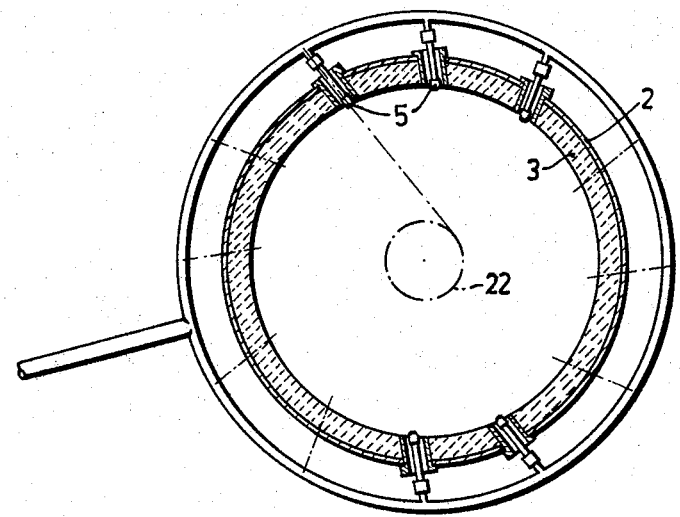
Figure 3:
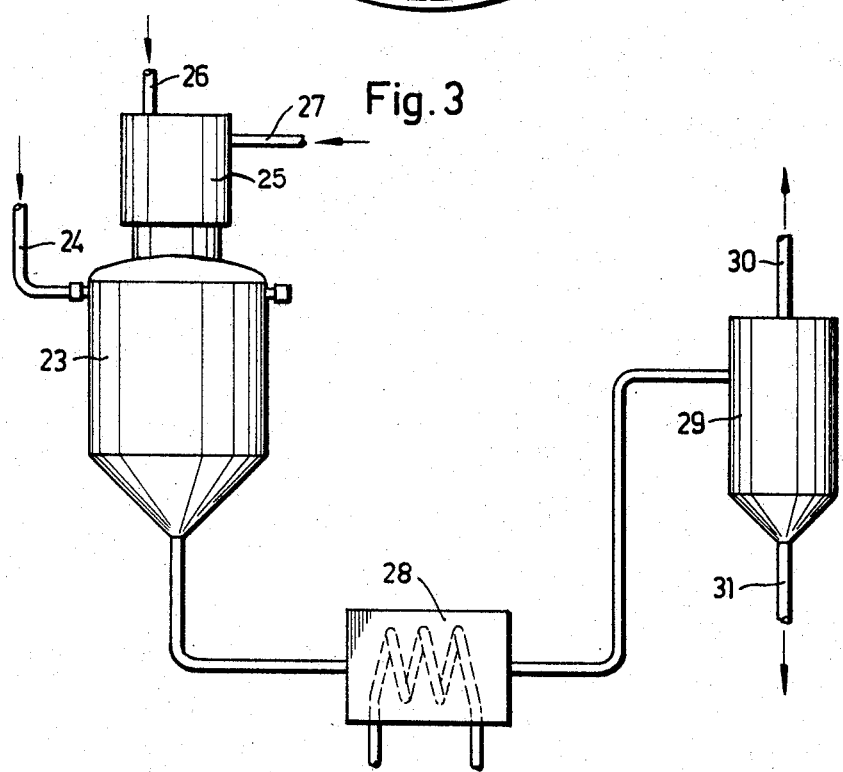

The invention will not be explained with reference to the accompanying drawing. FIG. 1 illustrates, as an example, a pyrolyzing reactor according to the invention. FIG. 2 illustrates a cross-section of the reactor of FIG. 1. FIG. 3 illustrates the process of the invention, including the separation of the powder from the combustible gas.

The illustrated reactor consists of a cylindrical chamber 1 defined by a gas-tight sheet metal casing 2 having a soda-resistant ceramic lining 3. The chamber 1 has a vertical axis and a circular cross-section. The top of the chamber has a lining consisting of refractory bricks 21. The top wall has a central hot gas inlet 4, through which the hot gas is supplied vertically. The evaporated liquor is supplied just below the cupola-shaped ceiling, through twelve nozzles 5 which are equally spaced around the circumference. The nozzles 5 are directed horizontally, that is at right angle to the vertical flow of hot gas entering the chamber 1 through the inlet opening 4. They may be directed a little upward or downward, but not more than 30° from the horizontal. The nozzles 5 are, see FIG. 2, situated somewhat tangentially, so as to be tangents to a circle 22. Said tangential direction facilitates the penetration of the hot gas stream through the entire height of the reactor, thus producing a thorough intermixing of the gas body in the reactor. The circle 22, which defines the tangential direction of the nozzles, shall preferably have a diameter which is below ⅓ of the diameter of the reactor. The exact diameter of the circle 22 must be found out for each particular reactor. It depends, for instance, upon the quantities of hot gas and spent liquor, and upon the velocities of the hot gas stream and the spray cones.

The nozzles 5 shall atomize the spent liquor to form droplets having an average size of approximately 100 microns. Preferably not more than 10% of the spent liquor shall be allower to form droplets having a size above 200 microns.

The inlet opening 4 of the hot gas shall preferably have a cross-sectional area which is less than ⅕ and preferably less than 1/10 of the cross-sectional area of the reactor chamber 1, for instance 1/20–1/40 of said area. Consequently, the jet of hot gas will move through the reactor at a substantial distance from the reactor wall, and a gas circulation will be established in the space between the jet of hot gas and the reactor wall, as indicated by the arrows. This gas circulation insures the desired thorough intermixing of the gas body in the reactor.

The hot gas is produced in a combustion chamber 12 situated above the reactor. Fuel oil is atomized in a nozzle 15. Air is supplied through the inlet opening 17 of a box 16 and enters the combustion chamber 12 through openings 14 in its wall 13. An extra quantity of air can be supplied to the bottom of the combustion chamber through inlets 18.

A cooling tube 6 is provided at the opening of the hot gas inlet 4, so as to prevent heat from being conducted from the hot gas inlet 4 to the bricks 21 forming the ceiling of the reactor chamber. Cooling air is supplied through a pipe 19, and the air leaving the cooling tube 6 enters the reactor via a conduit 20.

Gas and powder leave the reactor through a conduit 7 in the bottom of the reactor. Means are provided for removing soda or powder, if such soda or powder has accumulated in the reactor owing to temporary disturbances of the operation. Said means consist of an oil burner 8, protected by a protruding portion 9 of the furnace wall, and a discharging opening 10 through which molten soda can be withdrawn after the reactor has been shut off and the temperature has been temporarily increased above the melting point of the soda. As an additional safety means there is a clearing opening 11 through which the reactor can be inspected and solid matter, if any, can be removed in a manual operation.

The reactor is operated in this way. The liquor, supplied through the nozzles 5, and the hot gas cooperate so as to produce a thorough intermixing in the reactor. Consequently, the composition of the gas in the main portion of the reactor will be the same as that of the leaving gas, and the temperature will be nearly the same on the entire wall of the reactor. Therefore, the liquor from the nozzles will primarily intermix with the reducing pyrolysis gas, which does not contain molecular oxygen. The droplets dry and are pyrolyzed into soda and carbon. The pyrolysis gas meets the central oxygen-containing stream of hot gas supplied through inlet 4 and reacts while producing an intense heat. This generation of heat occurs in the central portion of the reactor at a safe distance from the reactor wall. The entire reactor wall is cooler than the interior of the reactor, thus preventing any local deposition of molten soda. The high temperature in the central zone produces a more complete pyrolysis, resulting in a lower content of carbon in the powder.

The means for removing soda are used only when soda has accumulated in the reactor after a disturbance of the operation, for instance, an unsatisfactory atomization.

The hot gas shall preferably be supplied at a temperature of 600–1600° C., preferably 800–1400, for instance 1100–1300° C. It shall preferably be supplied at a velocity of at least 20 meters per second, preferably 40–50 meters per second. The hot gas shall preferably contain 2–12 percent by volume of oxygen, most preferably 4–10 percent by volume. An oxygen content of 10 percent by volume corresponds to a quantity of air which is 100% in excess above the quantity required for a complete combustion of the fuel oil. Said excess of air is supplied through the inlet openings 18.

The atomizing nozzles shall preferably be operated by steam or another inert fluid, the weight ratio of atomizing fluid to liquor being preferably 0.1–0.4 and the pressure preferably at least 1 atmosphere gauge. The spent liquor shall preferably contain at least 40 percent solids, preferably at least 50 percent.

The apex angle of the spray cones can be varied by the atomizing fluid being given a rotary motion. The apex angle shall preferably be not more than approximately 75°, preferably less than 45°.

The difference in height between the hot gas inlet and the nozzles shall preferably not be more than half the diameter of the reactor in order to obtain a good intermixing of the gas body in the reactor. The distance between the nozzles shall preferably be more than 400 millimeters, and there shall preferably be at least four nozzles.

FIG. 3, illustrating the entire process, shows a pyrolyzing reactor 23 having means 24 for the supply of spent liquor, a combustion chamber 25 having means 26 and 27 for the supply of fuel oil and air, a heat exchanger 28 for the cooling of the gas from the reactor, and a cyclone separator 29 in which the powder is separated from the gas. The heat exchanger shall preferably cool down the hot gas from the reactor by 400–600°. For instance, if the gas leaving the reactor has a temperature of 700–800° C. it shall preferably be cooled down to 200–300° C. The powder leaves the separator through conduit 31 and the gas leaves through conduit 30. The soluble constituents of the powder are, if desired, separated from the insoluble carbon in a leaching process as known per se.

The reactor described above is only an example of the invention. The reactor can have a cross-section different from the circular one, for instance a rectangular or square cross-section. The reactor can be situated in a leaning or horizontal position, or even in an upside-down position, so that the hot gas enters in the bottom and the reaction products leave at the top.

The illustrated cooling of the reactor wall by the cooling tube 6 can be replaced by cool gas being blown onto the inside of the reactor wall, said cool gas being free from free oxygen.

*Example*

A reactor of the type disclosed in FIG. 1 had an inner diameter of 3.0 meters and a cylindrical height of 3.6 meters. A spent sulphite liquor, having been evaporated to a solids content of 50 percent by weight, was supplied at a rate of 10 metric tons per hour. The liquor was atomized in the twelve nozzles illustrated in FIG. 2 by means of steam in a quantity of 2.8 metric tons per hour. Fuel oil was supplied at a rate of 450 kilograms per hour, and air was supplied at a rate of 9,700 m.$^3$ per hour (measured at normal pressure and temperature).

The gas leaving the reactor amounted to 23,000 m.$^3$ per hour (measured at normal pressure and temperature) and had a temperature of 750° C. The gas was cooled in the heat exchanger to a temperature of 250° C. The powder suspended in the gas was separated in the cyclone separator. The powder quantity amounted to 2.1 metric tons per hour, and the powder had the following composition: $Na_2CO_3$=62 percent by weight; $Na_2SO_4$=7%; carbon=28%; sulphur=1%; ashes=2%. The gas leaving the cyclone separator had the following composition: $CO_2$=11.2 percent by volume; CO=1.5%; $H_2$=7.2%; $H_2S$=1.8; $H_2O$=44.6%; $N_2$=33.7%.

What is claimed is:

1. A method for the recovery of soda from a spent sodium-based cellulose liquor which comprises introducing a stream of an oxygen-containing gas having a temperature above 600° C. axially into a cylindrical space having a cross-sectional area at least ten times the cross-sectional area of said stream of gas, directing a plurality of streams of atomized spent sodium-based cellulose liquor toward and into contact with said stream of oxygen-containing gas and separating soda containing powder from the resulting gas mixture.

2. A method as defined in claim 1 in which said streams of atomized spent sodium-based cellulose liquor are directed toward said stream of oxygen containing gas from all directions.

3. A method as defined in claim 1 in which said stream of oxygen-containing gas contains 4 to 10% by volume of free oxygen.

4. A method as defined in claim 1 in which said stream of oxygen-containing gas has a temperature of 800–1400° C. and an oxygen content of 4–10% by volume and is introduced into said space at a velocity of 40–50 meters per second, said liquor has a solids content of more than 40% by weight and is atomized by steam in the ratio of from 0.1 to 0.4 kilogram of steam per kilogram of liquor and in which said streams of atomized liquor are cone shaped with an apex angle of less than 45°.

References Cited

UNITED STATES PATENTS

| | | | |
|---|---|---|---|
| 2,535,730 | 12/1950 | Gadret | 23—48 |
| 2,590,905 | 4/1952 | Tomlinson et al. | 23—48 X |
| 2,678,615 | 5/1954 | Soderlund et al. | |
| 2,744,812 | 5/1963 | Coulter, et al. | 23—262 |
| 3,073,672 | 1/1963 | Cederquist | 23—48 |
| 3,083,077 | 3/1963 | Bjorkman et al. | 23—48 |
| 3,161,475 | 12/1964 | Wilcoxson | 23—262 |

FOREIGN PATENTS 1,357,318  2/1964  France.

OSCAR R. VERTIZ, *Primary Examiner.*

BENJAMIN HENKIN, *Examiner.*

G. OZAKI, *Assistant Examiner.*